No. 650,671. Patented May 29, 1900.
W. M. DEUTSCH.
APPARATUS FOR PURIFYING WATER.
(Application filed Sept. 22, 1899.)
(No Model.)
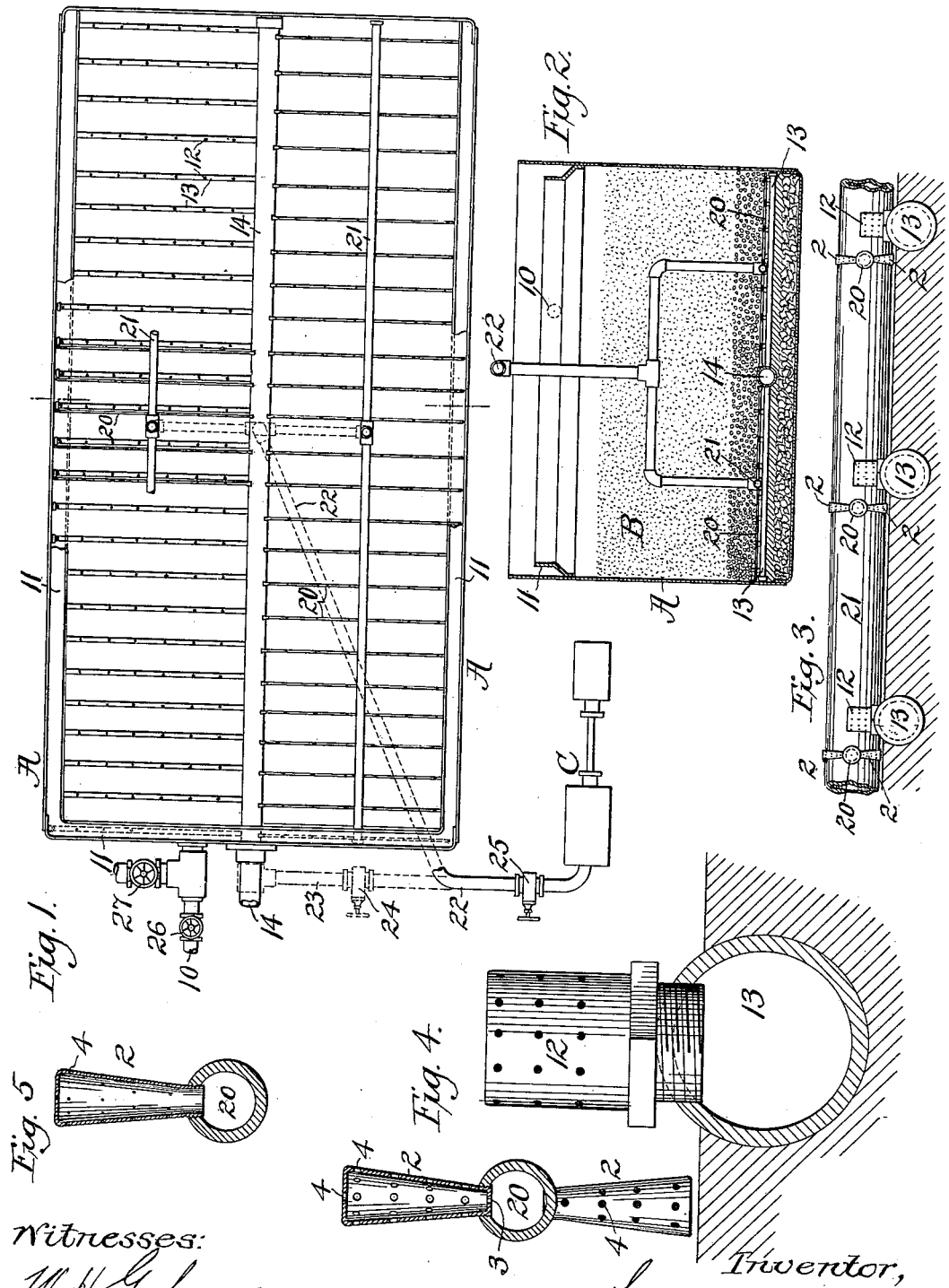

UNITED STATES PATENT OFFICE.

WILLIAM M. DEUTSCH, OF ELIZABETH, NEW JERSEY.

APPARATUS FOR PURIFYING WATER.

SPECIFICATION forming part of Letters Patent No. 650,671, dated May 29, 1900.

Application filed September 22, 1899. Serial No. 731,274. (No model.)

*To all whom it may concern:*

Be it known that I, WILLIAM M. DEUTSCH, a citizen of the United States of America, residing at the city of Elizabeth, county of Union, and State of New Jersey, have invented certain new and useful Improvements in Apparatus for Purifying Water, of which the following is a specification.

The present invention relates generally to filtering apparatus, and more particularly to that class in which the filtering-bed, such as sand or the like, has from time to time to be agitated and washed, so that the accumulated dirt may be removed and the bed cleansed.

These improvements, among other things, are directed to obtain a thorough, simple, and cheap means of washing and cleansing filtering-beds, to the end that a great saving is effected in the amount of water needed to properly cleanse the beds.

With these objects in view the invention consists in means for agitating the filtering-bed by a supply of air under suitable pressure properly directed into the lower part of the bed and caused to be thoroughly diffused throughout the bed, reaching every part of the sand to agitate every particle thereof, causing the attrition of the particles of sand against each other, which thus scour themselves, breaking up the lumps and completely freeing them of all dirt, so that the latter may be easily and quickly carried off by a minimum supply of washing-water.

The invention also consists in novel constructions and arrangements of the air and water pipes, and in the air-nozzles for effecting the thorough agitation of the sand of the filtering-bed with the air and the washing of the bed, and in other details and combinations of parts hereinafter set forth.

The accompanying drawings illustrate a practical embodiment of the invention, in which—

Figure 1 is a plan view of the filtering apparatus. Fig. 2 is a vertical cross-section of the same. Fig. 3 is an enlarged sectional elevation of the air and water pipes. Fig. 4 is a still further enlarged cross-section of the air and water pipes. Fig. 5 is a modified form of the air-distributer.

Referring to said drawings, the improvements are shown in connection with a tank, reservoir, or other receptacle A, having a filtering-bed composed of a body of sand or other suitable material B, through which the water to be filtered passes downwardly. As shown herein the tank is of rectangular form, with an open top of the gravity or non-pressure style, having a water-supply conduit 10 arranged at or near the top of said tank, leading to a trough 11, arranged around one or more of its sides, so that the water supplied thereto may flow in a thin sheet over the top of the trough and down onto the surface of the filtering-bed without unduly disturbing its condition. The filtered water on reaching the lower portion of the tank or reservoir passes outwardly through the strainer-nozzles 12, with which the eduction branch pipes 13 are supplied. These pipes, extending over the entire lower surface of the tank, lead, in this instance, from a main centrally-arranged eduction-pipe 14, extending outward and conducting the filtered water to the place of use or storage.

The strainer-nozzles 12 are preferably of cylindrical shape, with closed tops and screw-threaded lower portions to fit threaded openings in the branch pipes, the walls and tops of the nozzles being suitably perforated.

With the eduction water-pipes and suitably adjacent thereto are arranged a plurality of branch air-pipes 20, each having air-distributing nozzles 2 of such number as to cause the entire superimposed filter-bed to be aerated, its lumps broken up, the sand particles thoroughly agitated, and the accumulated dirt loosened ready for the washing operation. These branch air-pipes are in two series, each series emanating and extending in opposite directions from a main pipe 21, the said pipes 21 in turn being connected to an air-supply pipe 22, leading from a suitable air supply or compressor C.

The air branch pipes 20 are preferably arranged alongside of and parallel with the water branch pipes 13 and are so disposed as to effectively cover the entire horizontal area of the filtering apparatus to cause a thorough and even distribution of the air upward through the filtering-bed.

The air-distributer nozzles may, if desirable, be arranged as shown, projecting on both sides of the branch pipes. The nozzles are preferably of conical form, with closed top and bottom, the wider end being outermost and the narrow end screw-threaded into openings in the branch pipes. The side walls and tops of the nozzles are perforated with a suitable number of openings 4, the interior of the nozzles being supplied with air from the pipes through a smaller orifice 3 in the bottom of the cone, which acts to wiredraw or retard the air supplied to the nozzles, so that a more even distribution of air through the perforations 4 is effected. The air-distributing nozzles 2 may be placed along the branch pipes 20 at six inches to eight inches between centers, and the orifices admitting air thereto from the branch pipes will be regulated as to size to get a perfect distribution while the air is being supplied by the compressor. The orifice would ordinarily be from one-eighth of an inch to three thirty-seconds of an inch in diameter, but varied according to the amount of air required to accomplish the purpose, depending somewhat on the condition of the water being filtered and the amount of impurities the water being filtered contains.

In order to clear the air-pipes of air after each aerating and washing operation, a portion of the washing-water from the pipe 14 may be conducted by a branch pipe 23 (see dotted lines, Fig. 1) to the air-supply pipe 22, a suitable valve 24 in the pipe 23 controlling this water-supply and another valve 25 or check-valve in the pipe 22 preventing the water passing to the compressor.

In operation, after a filtering process has been concluded and the further supply of water cut off by closing the valve 26 in the water-supply pipe 10, and the waste-valve 27, communicating with said pipe, opened, the compressor C is started and air is forced through the pipe connections and air-distributing nozzles and thence upward through the filtering-bed and being thoroughly distributed therethrough effectively agitates the entire bed, loosening the accumulated dirt, breaking up the lumps, and causing an attrition of the particles of sand against each other, so that the dirt is perfectly freed therefrom. The supply of air is now cut off or stopped, and the washing-water is supplied to the lower part of the bed by the water-pipe 14 and thence by the branch pipes 13 and through the nozzles 12, passing upwardly through the bed and outwardly by the trough 11 and pipe 10 to the waste-pipe and sewer, carrying with it the accumulated and loosened dirt from the sand. The operation of aerating and washing may be repeated one or more times until the attendant is satisfied by the clearness of the washing-water that all the bed has been thoroughly cleansed.

As shown in Fig. 5, instead of making the central orifice 3 of such size as to wiredraw the air passing to the distributer 2, its perforations 4 may be sufficiently small to effect the same purpose.

What I claim is—

1. In a filter, the combination of a tank, a plurality of water-pipes, a superimposed filtering-bed, a plurality of air-supply pipes independent of the water-pipes and having air-distributing nozzles, extending from the pipes into the filtering-bed, and an air-supply connected with said air-pipes, as described.

2. In a filter, the combination of a tank, a plurality of water-pipes, a superimposed filtering-bed, a plurality of air-pipes arranged independent and alongside of the water-pipes, air-distributing nozzles, and an air-supply connected with said air-pipes, as described.

3. In a filter, the combination of a tank, a plurality of water-pipes, a plurality of air-pipes, a superimposed filtering-bed, air-distributing nozzles of reversed conical form connected to said air-pipes, and an air-supply, as described.

4. In a filter, the combination of a tank, a plurality of separated and independent water and air pipes, a superimposed filtering-bed, perforated air-distributing nozzles connected to said air-pipes having an air-admission orifice from the pipe smaller in area than the perforations, as described.

5. In a filter provided with means for aerating its superimposed filtering-bed, the herein-described air-distributing nozzle shaped to wiredraw the supply of air therethrough, as described.

6. In a filter, the combination of a tank, its filtering-bed and water-eduction pipes, leading from the lower portion of said bed, an open water-supply trough at the upper portion of the tank and a supply-conduit leading to said trough, as described.

7. In a filter, the combination of a tank, its water and air pipes, the superimposed filtering-bed, an air-supply connected to the air-pipes and a connection between the water and air pipes for expelling the unused air from the air-pipes, as described.

8. In a filter, the combination of a tank, its filtering-bed and water-eduction pipes, an open water-supply trough at the upper portion of the tank and arranged along the side of the tank, and a supply-conduit leading to said trough, as described.

In witness whereof I have hereunto set my hand.

W. M. DEUTSCH.

Witnesses:
DAVID R. FOWLER,
W. H. GRAHAM.